UNITED STATES PATENT OFFICE.

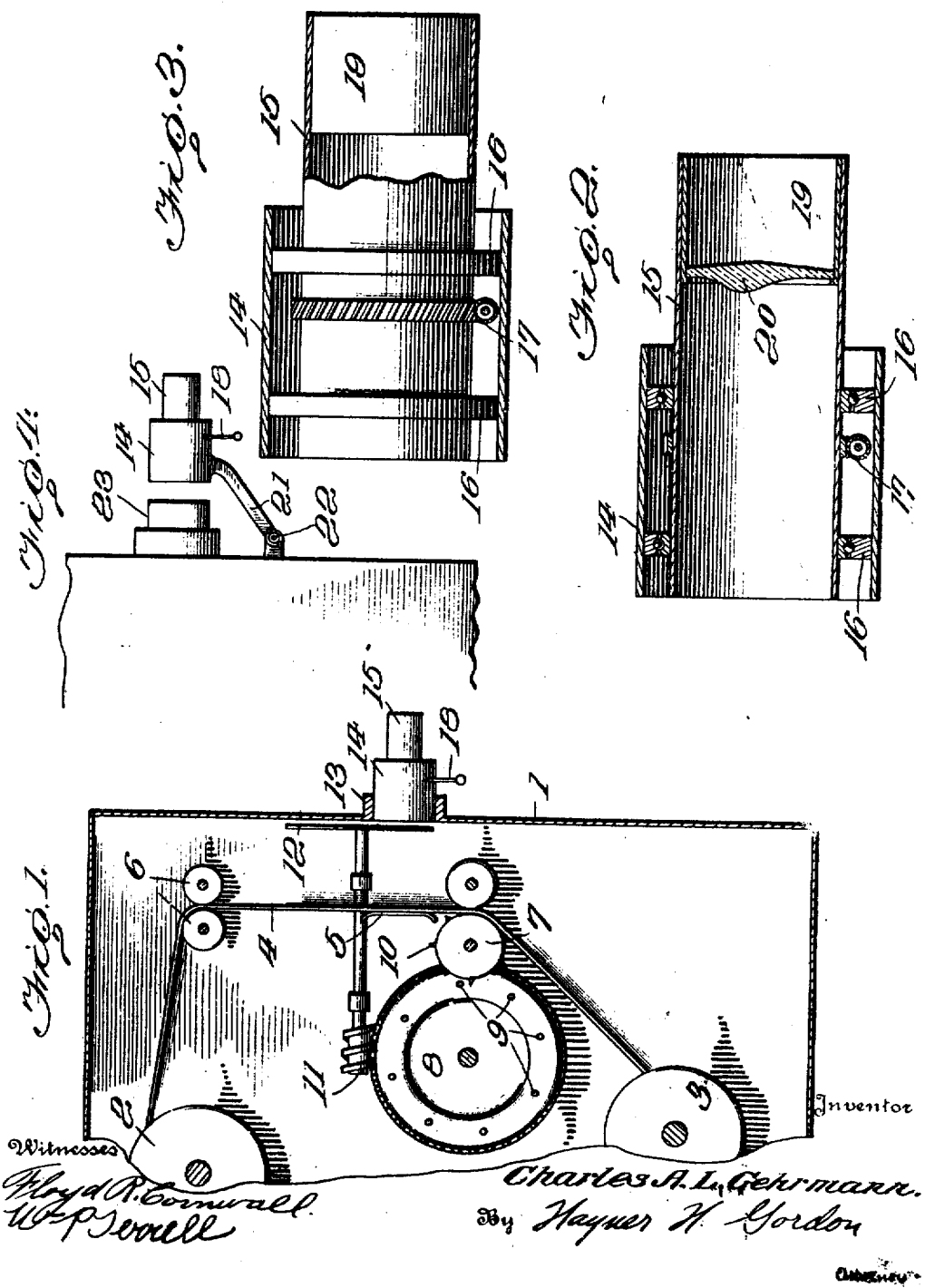

CHARLES A. L. GEHRMANN, OF SPRINGFIELD, ILLINOIS.

METHOD AND MEANS FOR PRODUCING MOTION-PICTURES.

1,323,180.  Specification of Letters Patent.  Patented Nov. 25, 1919.

Application filed March 16, 1917. Serial No. 155,289.

*To all whom it may concern:*

Be it known that I, CHARLES A. L. GEHR-MANN, a citizen of the United States, residing at 327 East Lawrence Ave., Springfield, Illinois, have invented certain new and useful Improvements in Methods and Means for Producing Motion-Pictures, of which the following is a full, clear, and complete specification, reference being had to the accompanying drawings.

The present invention relates to motion picture cameras or projection apparatus, of a type in which a series of images are formed by a lens upon a surface, the surface being either sensitized so as to secure photographic registration of the series of images, or else being of a light reflecting nature so that a large number of people may view the successive images.

In devices of this nature heretofore used, when abnormal or caricature pictures were desired it has often been necessary either to construct abnormal or special objects to photograph or else to draw each successive image and photograph the same, both of which methods usually entail great expense.

It is the general object of this invention to provide a simple structure which may be used either in connection with motion picture cameras or projection apparatus for the production of abnormal or distorted pictures.

A further object of this invention is the production of apparent motion of objects when both the camera and the objects are stationary.

Other objects of the invention will appear as the construction is more fully disclosed.

For the purpose of rendering the invention more clear, reference is had to the accompanying drawings, in which Figure 1 shows one form of the invention in structural relation with a motion picture camera.

Figs. 2 and 3 show enlarged sectional views of the device and Fig. 4 a modification thereof.

As illustrated, a motion picture camera casing 1 contains the film feed and winding rolls 2 and 3 which feed the film 4 into the optical plane 5 by means of the guide rolls 6 and the feed wheel 7. This feed wheel is driven in the usual manner by a master gear 8 fitted with pins 9 which coöperate with teeth 10 of the feed wheel 7, thereby imparting to the same an intermittent rotation, which motion serves to bring successive portions of the film 4 into the optical plane. The master gear 8 which is rotated by a handle located on the exterior of the camera casing, also serves to impart motion to the rotary shutter 12 by means of the worm gearing 11. Located in the front of the camera in direct alinement with the optical plane is a boss or projection 13 adapted to receive the various lens mountings such as are used in motion picture work. The particular lens mounting shown in Fig. 1 and in greater detail in Figs. 2 and 3, consists primarily of a tube or cylindrical member 14 inside of which is mounted a second tube or cylindrical member 15. This member is carried by the ball bearings 16 and may be rotated by means of the worm gearing 17 actuated by the handle or crank 18. Removably fitted to the interior of the tube 15 is a lens cell 19 in which is mounted a distortion or unsymmetrical lens 20. This interchangeable distortion lens may be of any type and may be designed to produce any degree or character of distortion in a manner well known to those skilled in the art, the design and construction of this lens in no way affecting the scope of the present invention.

It will now be evident that if the camera be placed in front of a suitable object and the drive wheel 8 rotated, the distortion lens 20, which acts as an objective, will photographically register a series of distorted images upon the film 4, and if at the same time the crank 18 be turned, the distortion of the successive images will continually change, thereby producing new and curious effects in the motion picture. If desired the crank 18 could be connected by suitable mechanism to the drive wheel 8 so as to be driven by the same.

The modification illustrated in Fig. 4 shows the lens mount 14 supported by a member 21 held in a bracket 22 in front of the objective of the camera 23. The lens used in this modification is a supplemental lens and the structure as shown enables the operator to make use of the distortion lens at any time without stopping the camera to remove the objective from the camera.

It should be further understood that while my invention as set forth in the drawings is shown in connection with a motion picture camera, that its use is in no way limited to the same as it is evident that a combination of lenses such as have been set forth could be used with motion picture projection apparatus, the distortion lenses being either substituted for, or used supplemental to the projection lens of the projection apparatus.

What I claim is:

1. In a motion picture camera, the combination with a movable sensitized surface adapted to receive a series of photographic impressions, of an unsymmetrical lens so located with reference to the plane of the film as to produce a distorted image thereon, means to successively expose portions of the sensitized surface to the image, and means to continuously rotate the said unsymmetrical lens so as to produce a progressive change of the plane of distortion in the series of photographic impressions registered upon the film.

2. In a motion picture camera, the combination with a movable sensitized surface, of an objective lens adapted to produce an image in the plane of said surface, means to move the sensitized surface and to photographically register upon said surface a series of impressions of said image; an unsymmetrical lens located in front of the objective lens to produce distortion in the image, and means to progressively rotate the unsymmetrical lens about the axis of the objective lens whereby distortion in the series of impressions registered upon the sensitized surface is continuously changed.

3. In a motion picture camera, the combination with a movable sensitized surface adapted to receive a series of photographic impressions, of an unsymmetrical lens so located with reference to the plane of the sensitized surface as to produce a distorted image thereon, means to successively expose portions of the sensitized surface to the image, and means to continuously move the unsymmetrical lens so as to produce a continuous change of distortion in the series of photographic impressions registered upon the film.

4. In a motion picture camera, the combination with a movable sensitized surface adapted to receive a series of photographic impressions, of an unsymmetrical lens so located with reference to the plane of the sensitized surface as to produce a distorted image thereon, means to successively expose portions of the sensitized surface to the image, and means to continuously move the unsymmetrical lens so as to produce a continuous change of angular distortion in the series of photographic impressions registered upon the film.

In testimony whereof I have hereunto set my hand.

CHARLES A. L. GEHRMANN.